US009583993B1

(12) United States Patent
Kaiser et al.

(10) Patent No.: US 9,583,993 B1
(45) Date of Patent: Feb. 28, 2017

(54) GENERATOR SYSTEM

(71) Applicant: TAZMAN TURBINZ, INC., Clearwater, FL (US)

(72) Inventors: Bruce A. Kaiser, Clearwater, FL (US); Bryon D. Hodges, Trumbull, CT (US); James R. Oldham, Dunedin, FL (US)

(73) Assignee: TAZMAN TURBINZ, INC., Clearwater, FL (US)

( * ) Notice: Subject to any disclaimer, the term of this patent is extended or adjusted under 35 U.S.C. 154(b) by 0 days.

(21) Appl. No.: 15/272,966

(22) Filed: Sep. 22, 2016

Related U.S. Application Data

(63) Continuation-in-part of application No. 14/966,868, filed on Dec. 11, 2015.

(51) Int. Cl.
*F03B 13/10* (2006.01)
*H02K 7/18* (2006.01)
*H02K 5/128* (2006.01)

(52) U.S. Cl.
CPC ......... *H02K 7/1823* (2013.01); *H02K 5/1285* (2013.01)

(58) Field of Classification Search
CPC ..................................... H02K 7/10
USPC .......................................... 290/54
See application file for complete search history.

(56) References Cited

U.S. PATENT DOCUMENTS

| 2,436,683 | A | 2/1948 | Wood, Jr. | |
| 4,740,711 | A | 4/1988 | Sato et al. | |
| 5,043,592 | A * | 8/1991 | Hochstrasser | F03B 13/00 290/52 |
| 6,011,334 | A | 1/2000 | Roland | |
| 7,102,249 | B2 | 9/2006 | Wobben | |
| 8,294,290 | B2 | 10/2012 | da Silva | |
| 8,786,120 | B2 * | 7/2014 | da Silva | F03B 13/105 290/52 |
| 8,796,894 | B2 * | 8/2014 | Filatov | H02K 7/09 310/216.008 |
| 9,243,604 | B2 * | 1/2016 | Montgomery | F03B 13/00 |
| 2008/0290663 | A1 * | 11/2008 | Shifrin | F03B 13/105 290/52 |
| 2012/0274066 | A1 | 11/2012 | Montgomery | |
| 2015/0145257 | A1 | 5/2015 | Hendricks | |
| 2015/0345260 | A1 | 12/2015 | Green et al. | |

FOREIGN PATENT DOCUMENTS

| AU | 2014333398 A1 * | 4/2015 | ............ F03B 13/086 |
| CA | 2352673 A1 | 1/2003 | |

* cited by examiner

*Primary Examiner* — Joseph Waks
(74) *Attorney, Agent, or Firm* — Buskop Law Group, PC; Wendy Buskop

(57) ABSTRACT

A generator system with a generator connected between a first preexisting pipe and a second preexisting pipe. The generating system can have a non-magnetic section of pipe, a flux guide, a plurality of coils, a non-rotating stator a rotating device, a plurality of rare earth, and a controller. Fluid flows through the first preexisting pipe flange towards the second preexisting pipe flange, which causes the rotating device to turn the rotating shaft that rotates the plurality of rare earth magnets to provide a magnetic flux energizing the plurality of coils generating a current of sufficient energy to produce at least six watts continuously.

19 Claims, 9 Drawing Sheets

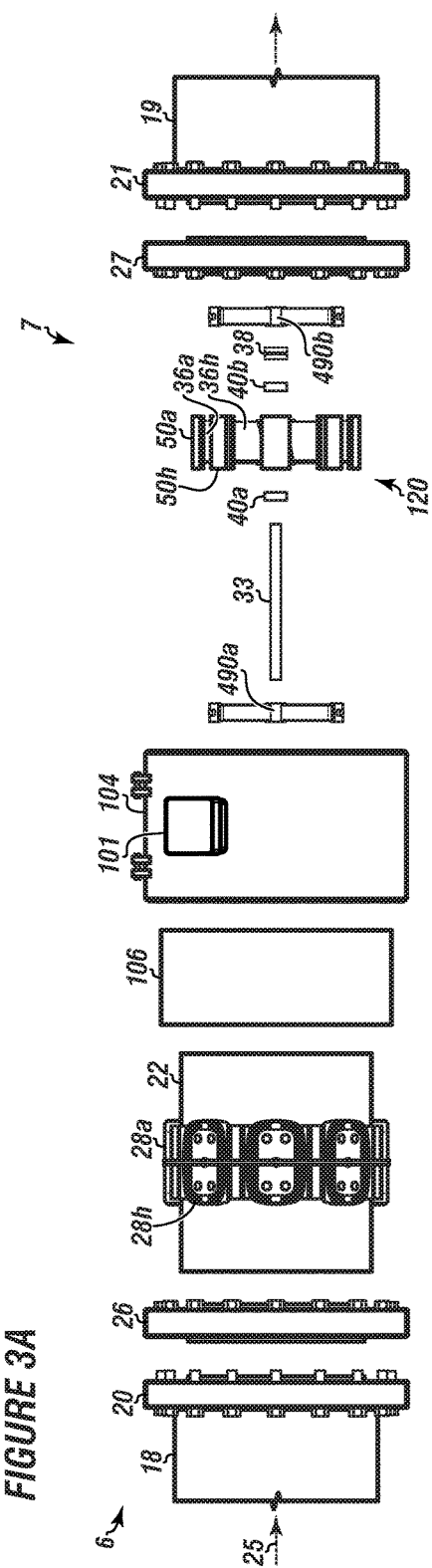
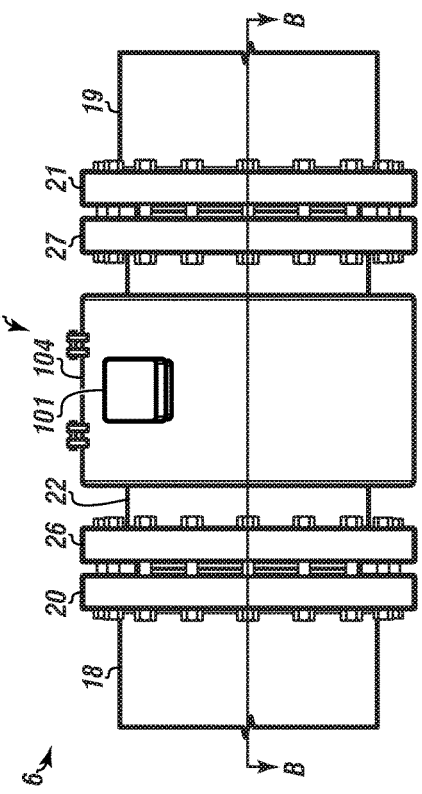
FIGURE 3A
FIGURE 3B

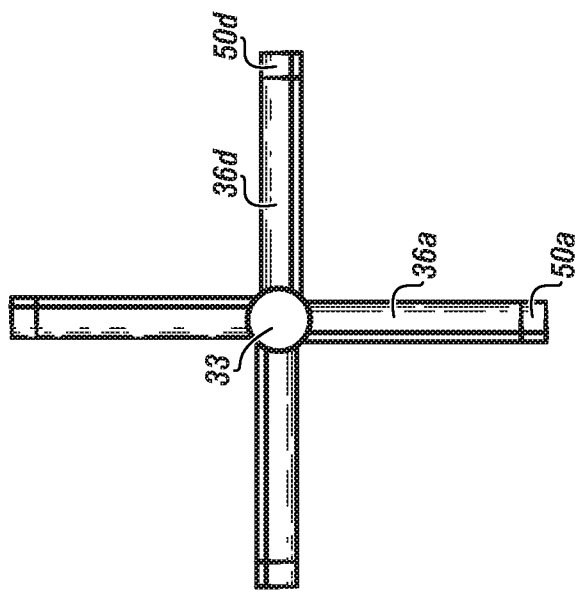
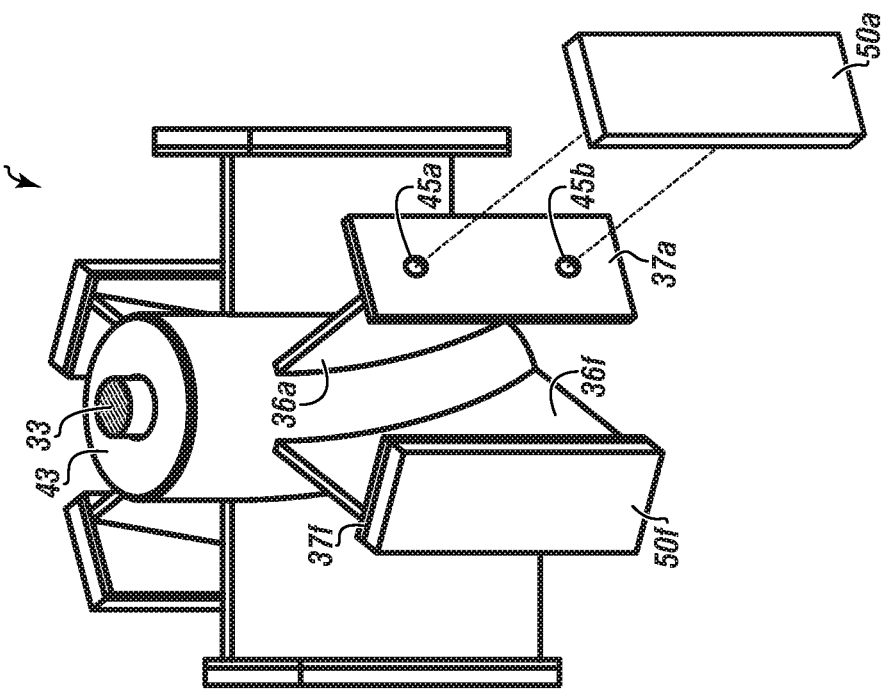

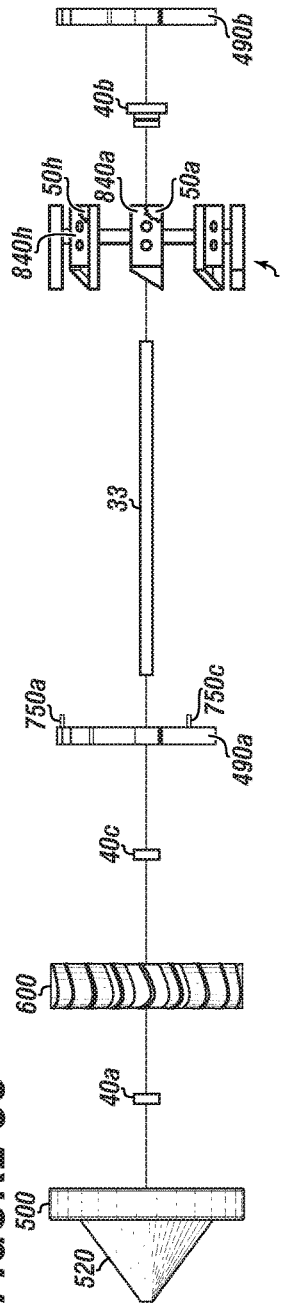
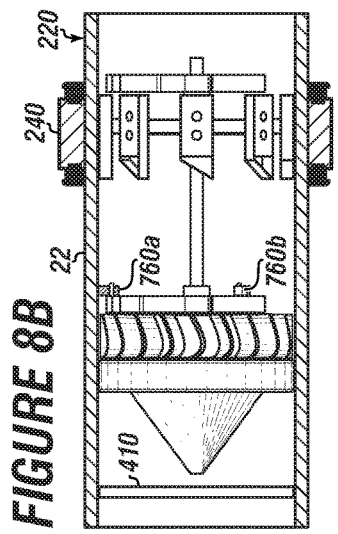
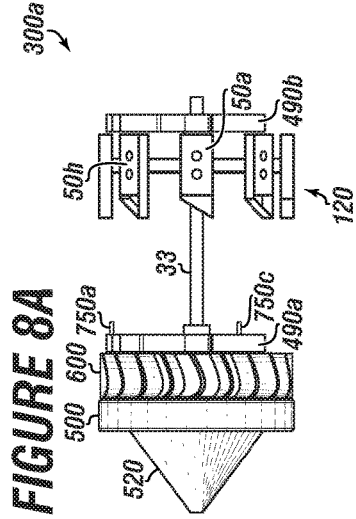
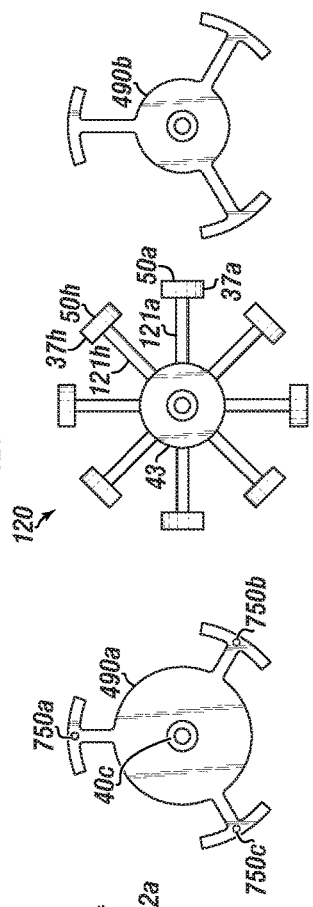
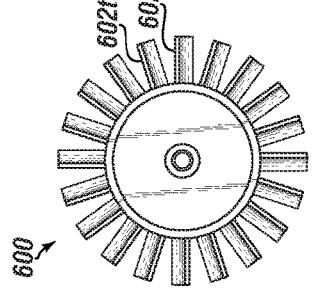
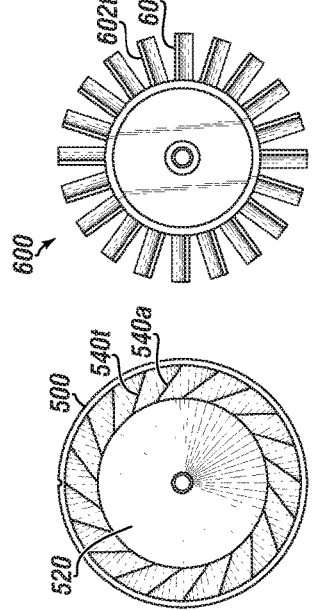

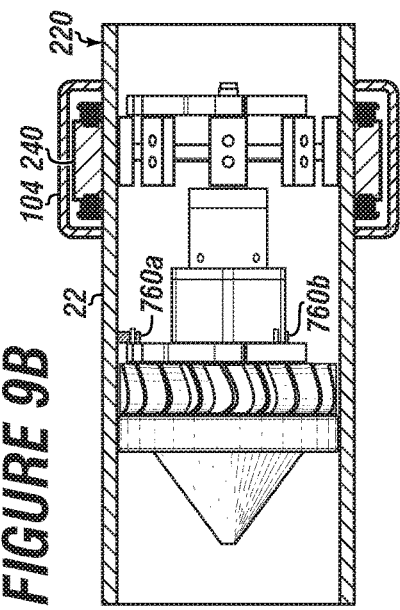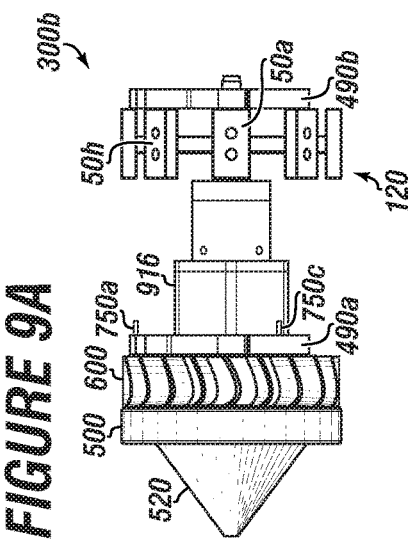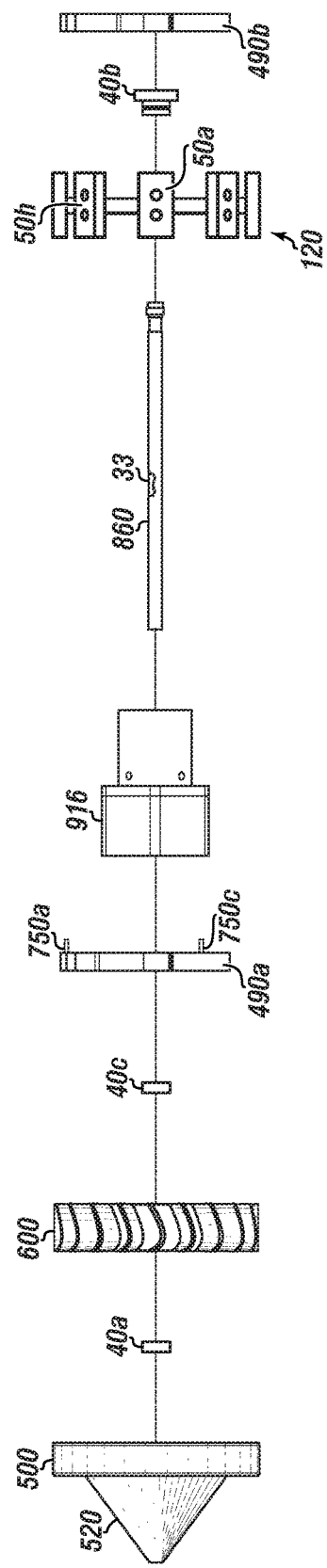

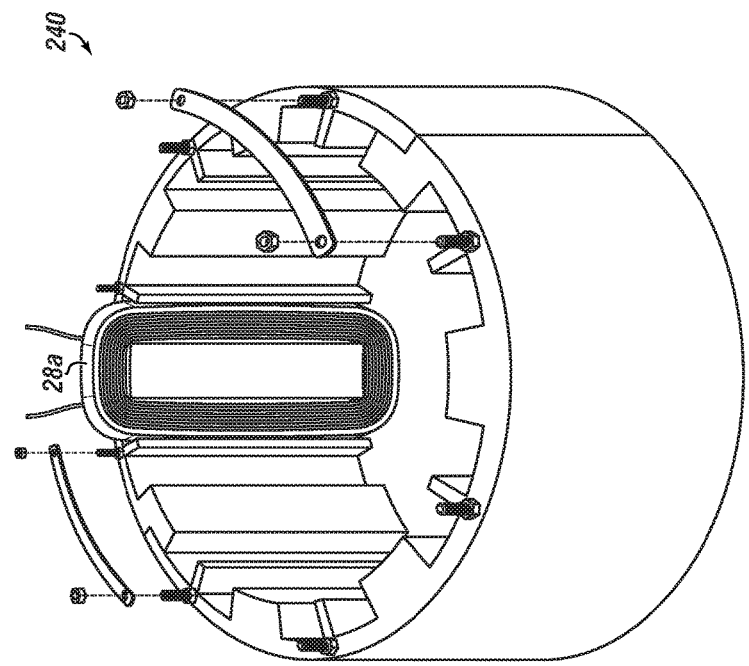
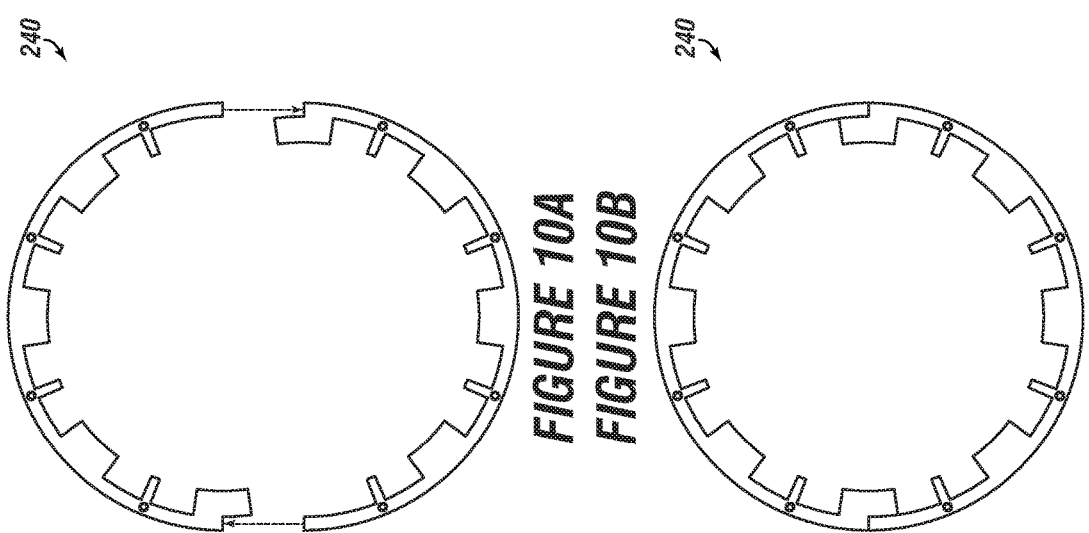

GENERATOR SYSTEM

CROSS REFERENCE TO RELATED APPLICATION

The current application is a Continuation in Part of co-pending U.S. patent application Ser. No. 14/966,868 filed on Dec. 11, 2015, entitled "GENERATOR SYSTEM". This reference is hereby incorporated in its entirety.

FIELD

The present embodiments generally relate to an in-pipe combustion-free generator system for producing electrical current.

BACKGROUND

A need exists for an in-pipe generator system for producing current using momentum of a fluid in a fluid pipe.

A need exists for an in-pipe generator system for a pipeline that requires no holes be created in the preexisting sections of pipe for leak tight integrity during operation.

The present embodiments meet these needs.

BRIEF DESCRIPTION OF THE DRAWINGS

The detailed description will be better understood in conjunction with the accompanying drawings as follows:

FIG. 3A is an exploded view of the generator system according to one or more embodiments.

FIG. 3B is an assembled view of the generator system according to one or more embodiments.

FIG. 5 is a detail of a magnet support usable with the generator system according to one or more embodiments.

FIG. 6 is another detail of a magnet support usable with the generator system according to one or more embodiments.

FIG. 8A is an assembled view of the generator according to one or more embodiments.

FIG. 8B is an assembled view of the generator according to one or more embodiments.

FIG. 8C is an exploded view of the generator according to one or more embodiments.

FIG. 8D is a non-rotating stator according to one or more embodiments.

FIG. 8E is a rotating device according to one or more embodiments.

FIG. 8F depicts a bearing support structure according to one or more embodiments.

FIG. 8G depicts a magnet support according to one or more embodiments.

FIG. 8H depicts a bearing support structure according to one or more embodiments.

FIG. 9A is an assembled view of the generator according to one or more embodiments.

FIG. 9B is an assembled view of the generator according to one or more embodiments.

FIG. 9C is an exploded view of the generator according to one or more embodiments.

FIG. 10A depicts an open configuration of a flux guide according to one or more embodiments.

FIG. 10B depicts a closed configuration of a flux guide according to one or more embodiments.

FIG. 10C depicts an exploded version of a flux guide according to one or more embodiments.

Figure 1A:
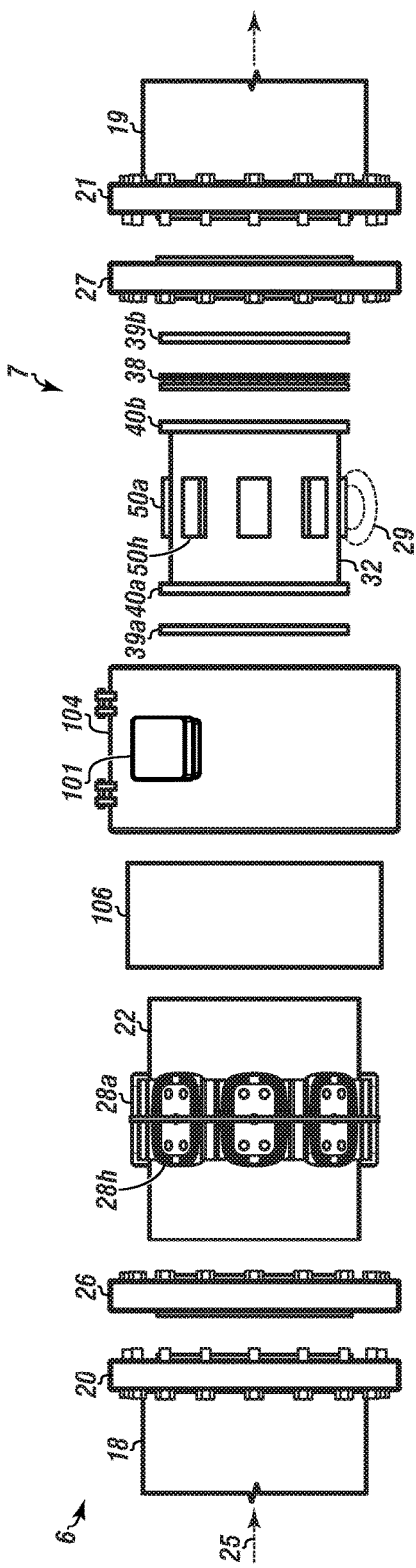
FIG. 1A is an exploded view of a generator system according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present embodiments generally relate to an in-pipe generator system for producing current using momentum of a fluid in a fluid pipe.

The in-pipe generator can be connected between a first preexisting pipe and a second preexisting pipe.

The in-pipe generator can have a non-magnetic section of pipe connected between the first preexisting pipe and the second preexisting pipe.

The in-pipe generator can have a flux guide secured to an outer surface of the non-magnetic section of pipe.

The in-pipe generator can have a plurality of coils contained between the flux guide and the non-magnetic section of pipe.

The flux guide can be arranged to focus magnetic flux into the plurality of coils.

The in-pipe generator can have a non-rotating stator in the non-magnetic section of pipe upstream of the plurality of coils. The non-rotating stator can have a plurality of inlet guide vanes.

The non-rotating stator can be oriented longitudinally within the non-magnetic section of pipe.

The in-pipe generator can have a plurality of rotating device or a plurality of rotating blade devices with fan blades connected to a rotating shaft.

The rotating shaft can extend through the non-rotating stator.

In embodiments, the rotating device can be configured to receive fluid from a plurality of inlet guide vanes. In embodiments, the rotating blade device with fan blades can be configured to receive fluid from the plurality of inlet guide vanes.

The in-pipe generator can have a plurality of rare earth magnets circumferentially mounted around the rotating shaft. The rotating shaft can be used for rotating the plurality of rare earth magnets.

The plurality of rare earth magnets can be configured to energize the plurality of coils.

The in-pipe generator can have a controller electrically connected to the plurality of coils for receiving energy produced by the plurality of coils and transmitting the current.

In operation, a fluid causes the plurality of rotating devices to turn the rotating shaft that rotates the plurality of rare earth magnets to provide a rotating magnetic flux energizing the plurality of coils, generating a current of sufficient energy to produce at least 6 watts continuously.

The generator system can also be specifically designed to prevent electrocution of persons inadvertently. The generator system provides low voltage, producing from 6 voltages to 48 voltages. The generator system can further be configured to provide sufficient energy to operate a supervisory control and data acquisition system.

The embodiments can prevent loss or injury, because the generator system does not interrupt the integrity of the existing pipeline.

The embodiments can prevent explosions, because the generator system does not allow electrical activity to take place when hydrocarbons, oxygen or other volatile gases or liquids are present.

The embodiments can prevent harm to the environment, because the generator system provides a method of generating electricity at remote sites without producing pollutants.

The embodiments can prevent fires, because the generator system does not use combustion and does not compromise the integrity of the existing pipeline.

The generator system can also produce sufficient energy to run site lighting for personal safety and security systems, such as remote cameras.

In embodiments, the generator system can also be used to charge cellular phones and other electronic devices.

The generator system can be used to charge utility batteries, such as batteries in a fork lift or a vehicle, such as an airplane that has been parked for an extended length of time.

In embodiments, the generator system can be monitored by a supervisory control and data acquisition system to view energy output.

In embodiments, multiple generators can be connected together as a generator system.

In embodiments, multiple generators can be simultaneously monitored to provide variable power to a central location. The multiple generators can be connected in series for control of voltage and in parallel for control of current.

The term "angular contact bearing" as used herein can refer to a type of mechanical, anti-friction device that supports a load in both radial and thrust capacity.

The term "bearing" as used herein can support load from the push of the gas against the rotating turbine blades, the bearings can allow the rotating turbine blades to spin freely in a translational manner and support the rotational load. In embodiments, the first bearing, the second bearing, or both the first and second bearings can be angular contact bearings or radial bearings with thrust bearings.

The term "bearing support structure" as used herein can refer to a device that separately centralizes the rotating shaft longitudinally in the center of the non-magnetic pipe.

The term "boss" as used herein can refer to a solid structure that receives each bearing support structure pin. The solid structure can be attached on an inner surface of the non-magnetic pipe. The boss absorbs the thrust loading and the rotational loading of at least one bearing support structure.

The term "current" as used herein can refer to either alternating or direct current. In an example, the current can provide watts, such as from 6 watts to 1000 watts.

The term "fluid" as used herein can refer to flowing particulate, flowing fluid, flowing gas or combinations thereof. The fluid can be at least one of: water, hydrocarbons, flowing particulate, chlorine, carbon dioxide or other entrained gas in a liquid.

The term "flux guide" as used herein can refer to a structure shaped to focus magnetic fields into contained coils.

The term "gear box" as used herein can refer to a container with at least two gears in a planetary orientation for providing a mechanical advantage to turn the plurality of rare earth magnets.

The term "controller" as used herein can refer to an enclosure for receiving current from the plurality of coils and transferring the current to another destination or different piece of equipment.

The term "load" as used herein can refer to a demand for power.

The term "magnetic flux" as used herein can refer to the varying magnetic field created by the rotating magnets.

The term "magnet seat" as used herein can refer to a structure that partially encloses and support an individual rare earth magnet.

The term "magnet support" as used herein can refer to a device that can support a plurality of magnet seats that enables rotation with the rotating shaft. In embodiments, the magnet support can contain the plurality of rotating turbine blades or a plurality of struts, which can pivotably surround the rotating shaft.

The term "non-magnetic section of pipe" as used herein can refer to a tubular structure, which is pressure resistant and non-deforming in the presence of the contained fluid and which will allow transmission of magnetic flux.

The term "non-rotating stator" as used herein can refer to a structure that directs the contained fluid into the rotating device. The non-rotating stator contains a plurality of inlet guide vanes for directing fluid from the non-magnetic section of pipe into the rotating device.

The term "particle diverter" as used herein can refer to a structure, which can be ring shaped that fits upstream of the non-rotating stator to move particles in the fluid into the plurality of inlet guide vanes.

The term "pipeline flanges" as used herein can refer to connectors that can connect around the outside of an existing pipeline for specifically joining the non-magnetic section of pipe to the existing pipeline without creating holes of any kind in the existing pipeline.

The term "plurality of coils" as used herein can refer to at least 2 and up to 36 coils positioned around the non-magnetic section of pipe, each coil can have an iron core with a fixed number of windings of wire, such as copper, of a particular size. The wire is insulated. The plurality of coils can be connected in series, in parallel or combinations thereof.

The term "plurality of inlet guide vanes" as used herein can refer to a plurality of openings circumferentially positioned around the non-rotating stator to direct fluid flow to the rotating device with or without fan blades.

The term "rare earth magnets" as used herein can refer to neodymium and other rare earth materials that create magnets. In embodiments, rare earth magnets can have a variety of shapes but generally have a dimension ranging from 0.5 inch to 2 inches. In embodiments, each rare earth magnet can generate from 3000 gauss to 24,000 gauss. In embodiments, each rare earth magnet can have an aerodynamic shape, such as the shape of an airfoil.

The term "rectifier" as used herein can refer to a device that changes AC current to DC current.

The term "rotating device" as used herein can refer to aerodynamic devices that provide translational torque to the rotating shaft. In embodiments, the rotating device or the rotating blade device with fan blades can propel the magnets of the generator system around in a circle. The fan blades can be used to maximize thrust from fluid flowing through the turbine. In embodiments, the fan blades can be in the shape of a propeller blade.

The term "rotating shaft" as used herein can refer to a length of precision ground material, such as 316 stainless steel or CF8M material that supports the rotating components of the generator.

The term "thrust bearing" as used herein can be a bearing that can support load in the direction of a horizontal thrust.

In embodiments, each generator without a rectifier of the generator system can produce from 200 watts to 1000 watts of 12 volts to 48 volts of three phase AC current.

In embodiments, each generator can have a gear box secured around the rotating shaft between the rotating device and the plurality of rare earth magnets.

In embodiments, each generator can have a first bearing connected between the rotating shaft and the non-rotating stator and contained within the non-rotating stator and optionally, a second bearing positioned downstream of the plurality of rare earth magnets.

In embodiments, each generator can have a plurality of non-rotating cone-free stators alternating with a rotating device with or without fan blades.

In embodiments, each generator can have a non-rotating stator with at least one cone secured upstream of the plurality of inlet guide vanes.

In embodiments, each generator can have from 2 coils to 36 coils per generator.

In embodiments, each generator can have from 50 windings to 500 windings per coil.

In embodiments, each generator can have at least one rectifier connected between the plurality of coils and a load.

Each rectifier can be configured for converting the current from alternating current to direct current.

In embodiments, each generator can have the non-magnetic section of pipe made from at least one of: a metal alloy, a composite, or a ceramic. The non-magnetic section of pipe can be configured to sustain up to 2100 psi without deforming.

In embodiments, each generator can have a rotating device with fan blades shaped aerodynamically to maximum thrust, such as boomerang shaped or wing shaped.

In embodiments, each generator can have a plurality of magnet seats, with at least one magnet seat per magnet.

Each individual magnet seat can support at least one of the plurality of rare earth magnets.

In embodiments, each generator can have an outer housing disposed around the non-magnetic section of pipe containing the plurality of coils.

The outer housing can be square, rectangular or cylindrical. The outer housing can be larger than the diameter of the non-magnetic section of pipe to contain the wiring of the plurality of coils.

In examples, the outer housing can have dimensions from 10 inches to 24 inches in length and from 10 inches to 24 inches in width. The outer housing can be made from any material that allows the outer housing to be used in a Class 1 containment area, as defined by the U.S. National Electrical Code (NEC) for use in a hazardous area in the presence of volatile gasses.

In embodiments, each generator can have a first preexisting pipe flange for engaging the first preexisting pipe, and a second preexisting pipe flange for engaging the second preexisting pipe with the non-magnetic section of pipe fluidly connected between the first and second pipe flanges.

In embodiments, each generator can have a particle diverter contained within the non-magnetic section of pipe upstream of the plurality of coils.

The particle diverter can be configured to move the fluid away from an outer surface of the non-magnetic section of pipe. In embodiments, the particle diverter can be a polymer or elastomeric ring which can be connected around the perimeter of the non-rotating stator.

In embodiments, each generator can have a thrust bearing and a bearing support structure. The bearing support structure can include at least three pins.

Each pin of the bearing support structure can engage a boss mounted to the inner diameter of the non-magnetic section of pipe.

Each pin and boss engagement stops the non-rotating stator from traveling longitudinally or rotating in the non-magnetic section of pipe.

In embodiments, each generator can have a magnet support for connecting around the rotating shaft and supporting the rare earth magnets.

In embodiments, each generator can have a non-corrosive encapsulation material around each of the plurality of rare earth magnets.

The non-corrosive encapsulation material can be a metallic material, a ceramic material or a polymeric material. For example, the encapsulation material can be nickel or chromium material. For example, the encapsulation material can be silica-based material. The non-corrosive encapsulation material can be polyurethane or another organic polymer.

The non-corrosive encapsulation material can be applied while fluid to the magnets and allowed to harden. In embodiments, the encapsulation material can have a thickness from 1 micron to 100 microns.

In embodiments, each generator can have a non-corrosive coating for at least one of: each non-rotating stator, each rotating blade, and the rotating shaft.

The non-corrosive coating can be from 1 micron to 100 microns in thickness. The non-corrosive coating can be applied to the top and or side of each magnet.

Turning now to the Figures, FIG. 1A is an exploded view of the generator system according to one or more embodiments.

The generator system 6 has a generator 7, which can be fluidly connected between a first preexisting pipe 18 and a second preexisting pipe 19 for flowing fluid 25.

The fluid can be a liquid, a liquid and a gas, a liquid with particulate, a gas with particulate or a liquid and a gas with particulate. In embodiments, the gas can be natural gas. The natural gas can be received by the generator system at the same pressure as the natural gas well is producing without deforming the generator.

In embodiments, the fluid can be a flowable very fine particulate.

In embodiments, hydrocarbon fluids, water, wine, and chemical fluids can be used in the generator system.

The generator 7 can include a first preexisting pipe flange 20 and a second preexisting pipe flange 21.

A first generator flange 26 can engage a non-magnetic section of pipe 22 and the first preexisting pipe flange 20 without forming any holes in the non-magnetic section of pipe.

In embodiments, the first generator flange can simultaneously engage the non-magnetic section of pipe and the first preexisting pipe flange. In embodiments, the first preexisting pipe flange can be welded to the first preexisting pipe.

A second generator flange 27 can engage the non-magnetic section of pipe 22 and the second preexisting pipe flange 21 without forming any holes in the non-magnetic section of pipe.

In embodiments, the second generator flange can simultaneously engage the non-magnetic section of pipe and the second preexisting pipe flange. In embodiments, the second preexisting pipe flange can be welded to the second preexisting pipe.

The generator system 6 can include a plurality of coils 28a-28h, which can be circumferentially secured to a non-magnetic section of pipe 22 for generating current when energized by a plurality of rotating magnetic flux, each magnetic flux generated by at least one rare earth magnet of a plurality of rare earth magnets 50a-50h.

In embodiments, the generator system can use from 2 coils to 36 coils per generator.

In embodiments, the generator system can use from 50 windings to 500 windings per coil of the plurality of coils.

The generator system can include a rotating drum 32, which can be mounted within the non-magnetic section of pipe 22.

In embodiments, the rotating drum 32 can extend longitudinally within the non-magnetic section of pipe 22. The non-magnetic pipe can be 2 feet long or any length desired by a customer. The rotating drum 32 can have a length shorter than the non-magnetic section pipe 22.

The plurality of rare earth magnets 50a-50h can be circumferentially secured to the rotating drum 32, such as mounted to extend through the surface of the rotating drum.

The plurality of rare earth magnets can be configured to energize the plurality of coils 28a-28h.

A first bearing 40b can be positioned in the non-magnetic section of pipe at a downstream location to the rotating drum 32.

In embodiments, the first bearing 40b can be an angular contact bearing or a radial bearing with a thrust bearing 38.

In embodiments, a second bearing 40a can be positioned in the non-magnetic section of pipe at an upstream location to the rotating drum. In embodiments, the second bearing can be a radial bearing.

A pair of annular rings 39a and 39b can be mounted to the non-magnetic section of pipe 22 and can be configured to contain the second bearing 40a, which can be a radial bearing, and the first bearing 40b and the rotating drum 32 within the non-magnetic section of pipe 22.

The pair of annular rings 39a and 39b can each be configured with an aerodynamic shape to optimize gas flow through the generator;

In embodiments, the pair of annular rings 39a and 39b can have a diameter slightly smaller than the inner diameter of the non-magnetic section of pipe.

The thrust bearing 38 can be positioned between one of the annular rings and one of the bearings at a downstream location of the rotating drum.

A controller 101 can be electrically connected to the plurality of coils 28a-28h for receiving energy produced by the plurality of coils and for transmitting current.

Figure 1B:
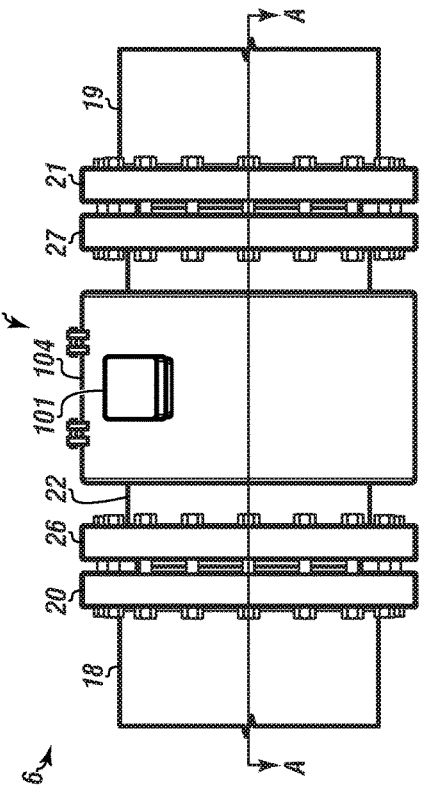
FIG. 1B is an assembled view of the generator system according to one or more embodiments.

It should be noted that FIGS. 1A and 1B show the moving fluid 25 flowing into the preexisting pipe through the first preexisting pipe 18 towards the second preexisting pipe 19. The moving fluid causes the plurality of rotating turbine blades of the rotating drum to spin, turning the rotating drum.

As the rotating drum spins, a magnetic flux 29 can be provided by each of the rare earth magnets attached to the rotating drum. In embodiments the rare earth magnets can be "counter-sunk" into the rotating drum, optimizing the distance from the inside of the non-magnetic section of pipe. The magnetic flux 29 can energize the plurality of coils mounted on the non-magnetic section of pipe.

The plurality of coils can be energized for generating current of sufficient energy to produce at least 200 watts continuously.

An outer housing 104 can be configured to surround the plurality of coils 28a-28h of the non-magnetic section of pipe 22 between the first generator flange 26 and the second generator flange 27.

In embodiments, a sleeve 106 can be mounted in the non-magnetic section of pipe 22 to redirect the magnetic flux 29.

In embodiments, the sleeve 106 can be a thin piece of metal with a thickness from 1/16 of an inch to 1/4 of an inch to focus and concentrate the plurality of magnetic flux.

FIG. 1B is an assembled view of the generator system according to one or more embodiments.

The generator system 6 is shown with the generator 7, which can be fluidly connected between the first preexisting pipe 18 and the second preexisting pipe 19.

The first preexisting pipe flange 20 can be mounted to the first preexisting pipe 18 and the second preexisting pipe flange 21 can engage the second preexisting pipe.

The first generator flange 26 can engage the non-magnetic section of pipe 22 and the first preexisting pipe flange 20 and the second generator flange 27 can engage the non-magnetic section of pipe 22 and the second preexisting pipe flange 21.

The outer housing 104 is shown surrounding the plurality of coils of the non-magnetic section of pipe between the first generator flange 26 and the second generator flange 27.

The controller 101 can be electrically connected to the plurality of coils for receiving energy produced by the plurality of coils and transmitting current.

Figure 2:
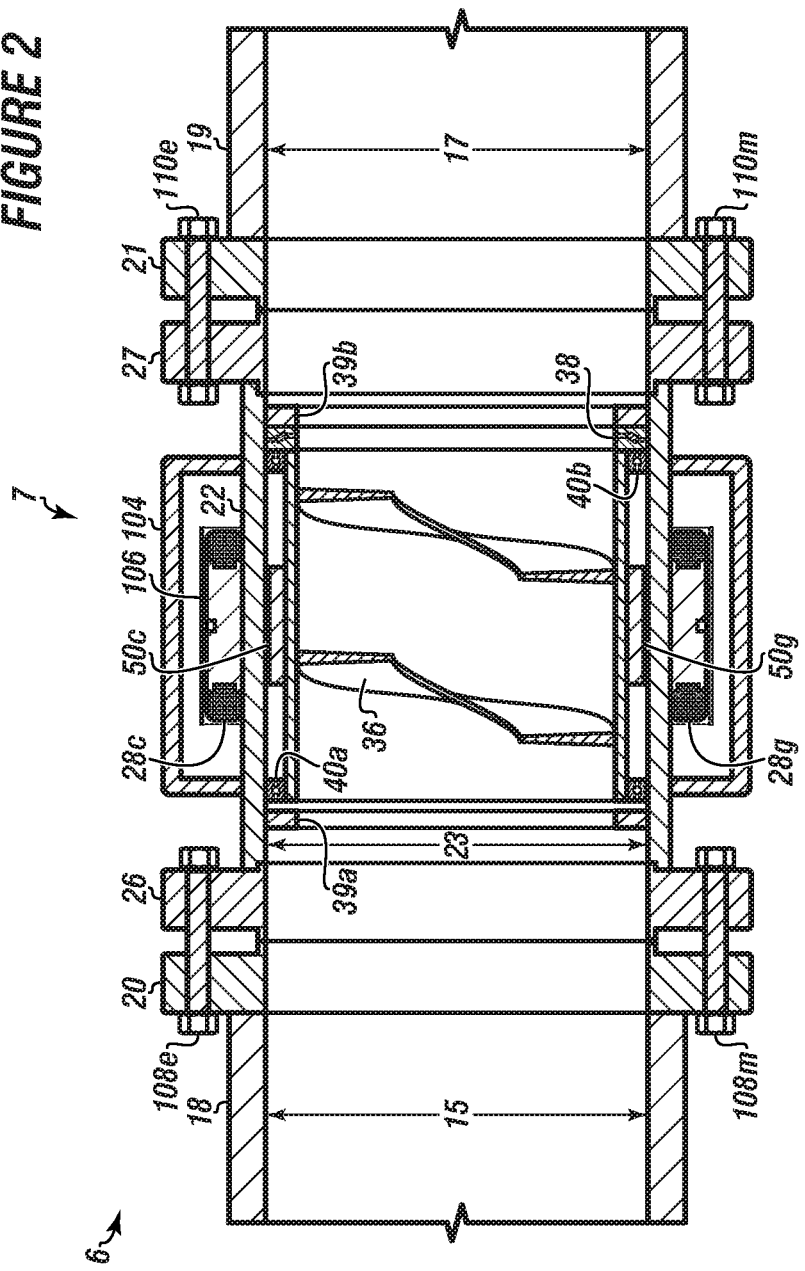
FIG. 2 is a cross sectional view of the generator system of FIG. 1B cut along line A-A.

FIG. 2 is a cross sectional view of the generator system of FIG. 1B cut along line A-A.

The generator system 6 is shown with the generator 7, which can be connected fluidly between the first preexisting pipe 18 and the second preexisting pipe 19.

The first preexisting pipe flange 20 can be connected to the first generator flange 26 using a first plurality of fasteners 108e-108m.

The first preexisting pipe 18 can have a first preexisting pipe inner diameter 15 and the second preexisting pipe 19 can have a second preexisting pipe inner diameter 17.

The non-magnetic section of pipe 22 can have a non-magnetic section of pipe inner diameter 23. In embodiments, the non-magnetic section of pipe inner diameter 23 can be identical to the first preexisting pipe inner diameter 15 and the second preexisting pipe inner diameter 17. In embodiments, the inner diameters can be different.

The second preexisting pipe flange 21 can be connected to the second generator flange 27 using a second plurality of fasteners 110e-110m.

Two coils of the plurality of coils 28c and 28g are shown. The coils of the plurality of coils can be circumferentially secured on the non-magnetic section of pipe 22 for generating current when energized by magnetic flux produced by each of the plurality of rare earth magnets 50c and 50g.

In embodiments, the rotating drum can have a plurality of rotating turbine blades 36.

The first bearing 40b can be positioned in the non-magnetic section of pipe at a downstream location to the rotating drum. The second bearing 40*a* can be positioned in the non-magnetic section of pipe at an upstream location to the rotating drum.

The pair of annular rings 39*a* and 39*b* are shown mounted to the non-magnetic section of pipe 22, which can be configured for containing the first bearing 40*b* and the rotating drum within the non-magnetic section of pipe.

The thrust bearing 38 can be positioned between one of the annular rings and one of the bearings at a downstream location to the rotating drum.

The outer housing 104 can be configured to surround the plurality of coils of the non-magnetic section of pipe and the sleeve 106 mounted in the non-magnetic section of pipe to redirect the magnetic flux.

In embodiments, the non-magnetic section of pipe can be at least one of: a non-ferrous metal, a composite, or a ceramic configured to sustain up to 2100 psi without deforming.

In embodiments, each of the plurality of rotating turbine blades can be curved aerodynamically.

FIG. 3A is an exploded view of the generator system according to one or more embodiments.

In this embodiment, the generator system 6 shows the generator 7, which can be fluidly connected between the first preexisting pipe 18 and the second preexisting pipe 19 for flowing fluid 25.

The generator 7 can include the first preexisting pipe flange 20 and the second preexisting pipe flange 21.

The first generator flange 26 can engage the non-magnetic section of pipe 22 and the first preexisting pipe flange 20 and the second generator flange 27 can engage the non-magnetic section of pipe 22 and the second preexisting pipe flange 21.

The plurality of coils 28*a*-28*h* can be circumferentially secured on the non-magnetic section of pipe 22 for generating current when energized by magnetic flux from the plurality of rare earth magnets.

In this embodiment, a magnet support 120 can be mounted within the non-magnetic section of pipe 22.

The magnet support 120 can have a rotating shaft 33, which can longitudinally extend within the non-magnetic section of pipe 22.

The magnet support 120 can contain the plurality of rotating turbine blades 36*a*-36*h*, which can pivotably surround the rotating shaft 33.

The plurality of rotating turbine blades can extend to be proximate to the non-magnetic section of pipe without touching the non-magnetic section of pipe.

Each rare earth magnet of the plurality of rare earth magnets 50*a*-50*h* can be installed on each of the plurality of rotating turbine blades 36*a*-36*h* at a location close to the non-magnetic section of pipe without touching the non-magnetic section of pipe.

In embodiment, the plurality of rare earth magnets can be configured to energize the plurality of coils.

A pair of bearing support structures 490*a* and 490*b* can be mounted on either side of the magnet support 120.

The first bearing 40*b* can be positioned in the non-magnetic section of pipe at a downstream location to the magnet support and the second bearing 40*a* can be positioned in the non-magnetic section of pipe at an upstream location to the magnet support.

The thrust bearing 38 can be positioned between the first bearing 40*b* and at least one of the bearing support structures 490*b*.

The controller 101 is shown electrically connected to the plurality of coils for receiving energy produced by the plurality of coils and transmitting a current.

In this embodiment, the fluid 25 flows through the first preexisting pipe 18 towards the second preexisting pipe 19 causing the plurality of rotating turbine blades to rotate generating the magnetic flux and energizing the plurality of coils which in turn generate current of sufficient energy to produce at least 200 watts continuously.

The outer housing 104 can be configured to surround the plurality of coils of the non-magnetic section of pipe between the first generator flange 26 and the second generator flange 27.

The sleeve 106 can be mounted in the non-magnetic section of pipe to redirect the magnetic flux.

FIG. 3B is an assembled view of the generator system according to one or more embodiments.

The generator system 6 is shown with the generator 7, which can be connected between the first preexisting pipe 18 and the second preexisting pipe 19.

The first preexisting pipe flange 20 is shown mounted to the first preexisting pipe 18 and the second preexisting pipe flange 21 is shown engaging the second preexisting pipe 19.

The first generator flange 26 is shown engaging simultaneously the non-magnetic section of pipe 22 and the first preexisting pipe flange 20 and the second generator flange 27 is shown engaging simultaneously the non-magnetic section of pipe 22 and the second preexisting pipe flange 21.

The outer housing 104 can be between the first generator flange 26 and the second generator flange 27.

The controller 101 can be electrically connected to the plurality of coils for receiving energy produced by the plurality of coils and transmitting a current.

Figure 4:
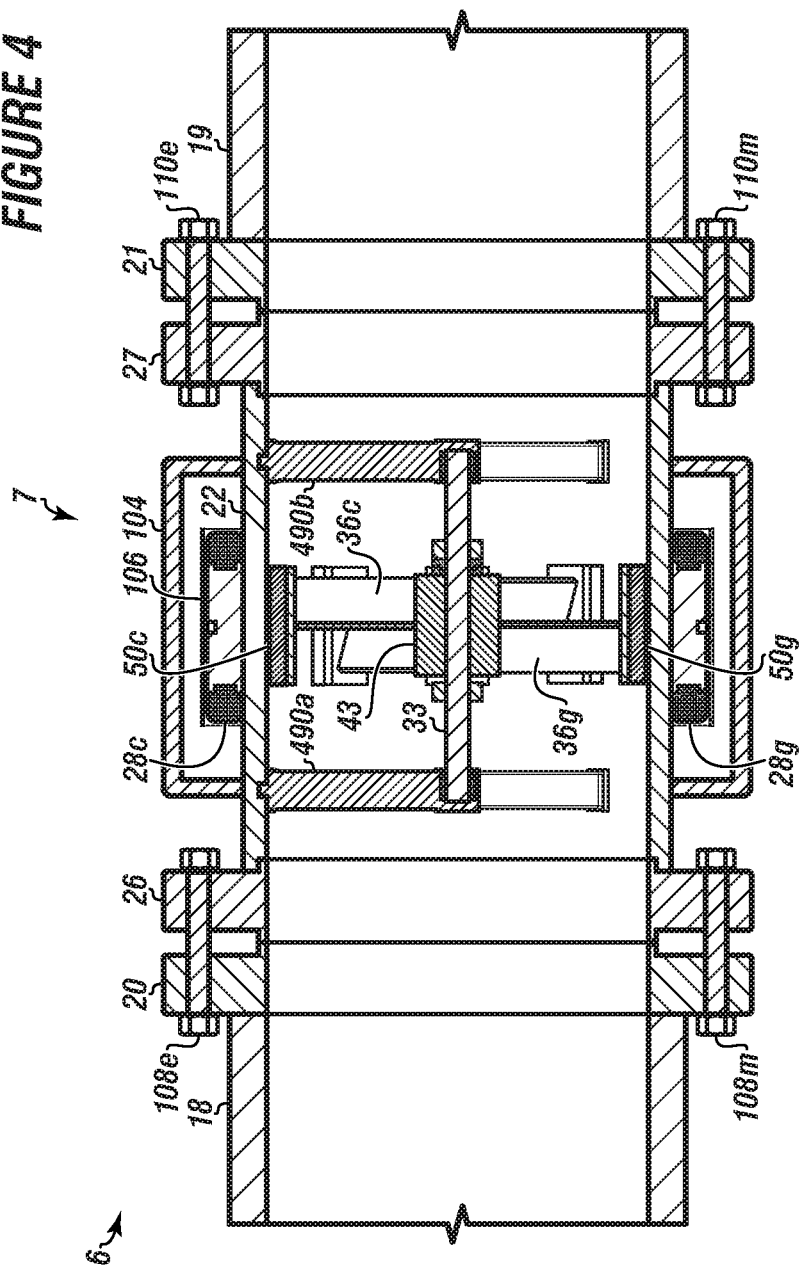
FIG. 4 is a cross sectional view of the generator system of FIG. 3B cut along line B-B.

FIG. 4 is a cross sectional view of the generator system of FIG. 3B cut along line B-B.

The generator system 6 is shown with the generator 7, which can be connected fluidly between the first preexisting pipe 18 and the second preexisting pipe 19.

The first preexisting pipe flange 20 can be connected to the first generator flange 26 using the first plurality of fasteners 108*e*-108*m*.

The second preexisting pipe flange 21 can be connected to the second generator flange 27 with the second plurality of fasteners 110*e*-110*m*.

The outer housing 104, the sleeve 106, the non-magnetic section of pipe 22, and two coils of the plurality of coils 28*c* and 28*g* are shown.

Each rare earth magnet of the plurality of rare earth magnets 50*c* and 50*g* can be installed on each of the plurality of rotating turbine blades 36*c* and 36*g* at a location close to the non-magnetic section of pipe without touching the non-magnetic section of pipe.

A blade mount 43 can be used to mount and support the magnet support.

The pair of bearing support structures 490*a* and 490*b* can be mounted on either side of the rotating shaft 33.

The plurality of rare earth magnets can be configured to energize the plurality of coils.

In embodiments, each of the plurality of rotating turbine blades can be curved, such curved like a propeller blade.

FIG. 5 is a detail of a magnet support usable with the generator system according to one or more embodiments.

A magnet support 120 is shown with the rotating shaft 33 and the blade mount 43.

The plurality of rotating turbine blades 36*a*-36*f* are shown pivotably surrounding the rotating shaft.

The plurality of rotating turbine blades 36*a*-36*f* can connect to the blade mount 43 and the blade mount can rotate around the rotating shaft 33.

In this embodiment, each of the plurality of rotating turbine blades 36a-36f can have a magnet seat 37a-37f. Each magnet seat is for supporting at least one of the plurality of rare earth magnets 50a-50f without disturbing fluid flow passing the plurality of rotating turbine blades.

In embodiments, each magnet seat 37a-37f can have screw holes 45a and 45b, which can be used for securing at least one of the pluralities of rare earth magnets to at least one of the plurality of rotating turbine blades.

In embodiments, the magnet support can have from 2 coils to 36 coils per generator system.

In embodiments, each of the plurality of coils can use from 50 windings to 500 windings per coil.

FIG. 6 is another detail of a magnet support usable with the generator system according to one or more embodiments.

The magnet support is shown with the rotating shaft 33 and the plurality of rotating turbine blades 36a-36d pivotably surrounding the rotating shaft.

In this embodiment, the plurality of rare earth magnets 50a-50d can be secured to the plurality of rotating turbine blades 36a-36d, without the use of the magnet seats.

Figure 7:
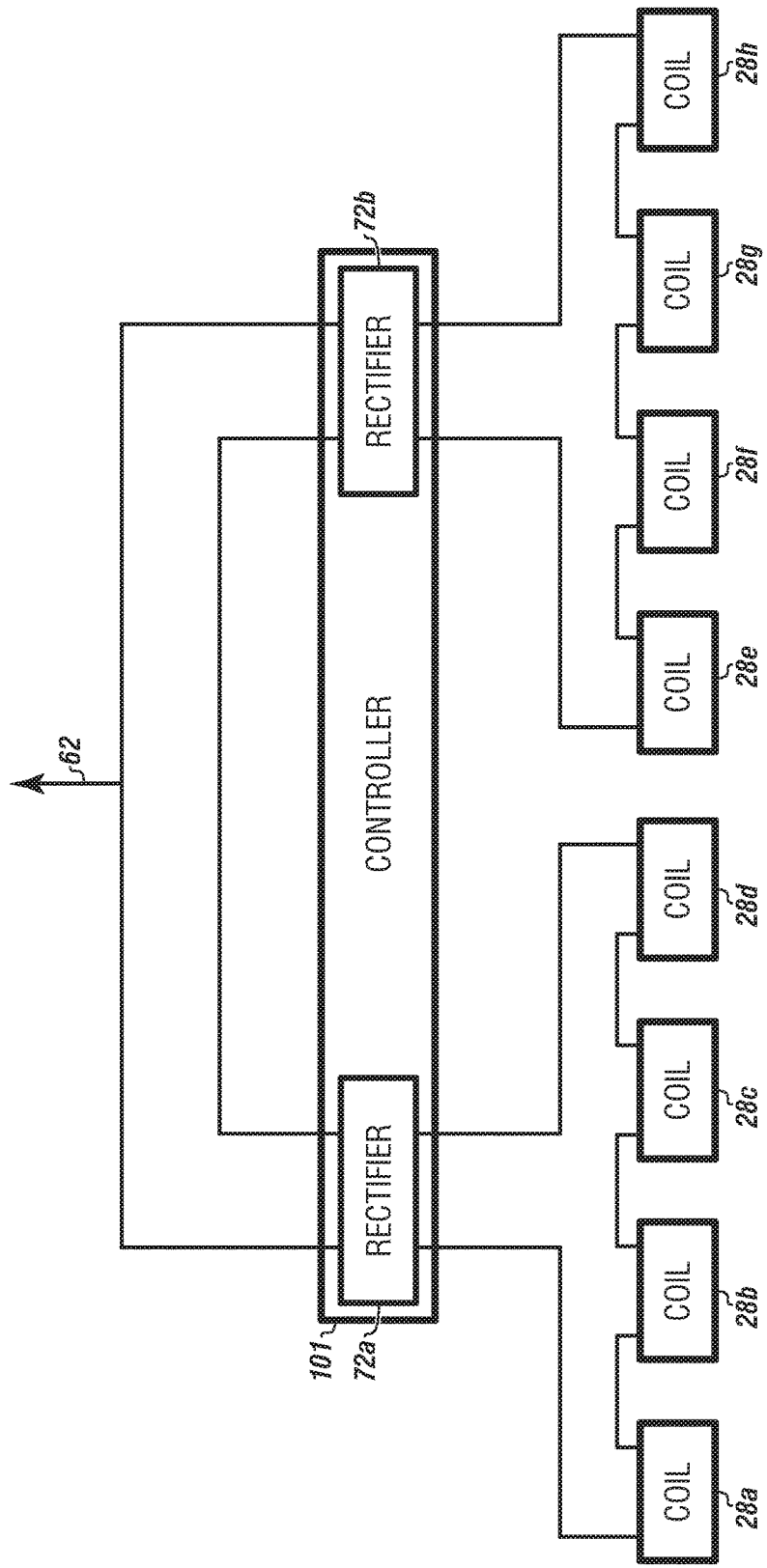
FIG. 7 depicts a diagram of the generator system with at least one rectifier for converting current according to one or more embodiments.

FIG. 7 depicts a diagram of the generator system with at least one rectifier for converting current according to one or more embodiments.

The controller 101 can contain at least one rectifier 72a and 72b for converting current 62 usable with the generator system.

The at least one rectifier 72a and 72b can be connected between the plurality of coils 28a-28h and a load for converting the current 62 from alternative current to direct current.

FIG. 8A is an assembled view of the generator according to one or more embodiments. FIG. 8B is an assembled view of the generator according to one or more embodiments. FIG. 8C is an exploded view of the generator according to one or more embodiments.

In embodiments, the generator can have a non-rotating stator 500 in the nonmagnetic section of pipe 22.

In embodiments, the non-magnetic section of pipe 22 can be connected between the first preexisting pipe and the second preexisting pipe. The first preexisting pipe flange can engage the first preexisting pipe and the second preexisting pipe flange can engage the second preexisting pipe. The non-magnetic section of pipe 22 can be fluidly connected between the first pipe flange and second pipe flange.

In embodiments, the non-magnetic section of pipe 22 can be at least one of: a metal alloy, a composite, and a ceramic. The non-magnetic section of pipe can be configured to sustain up to 2100 psi without deforming.

A flux guide 240 can be secured to an outer surface 220 of the non-magnetic section of pipe 22.

In embodiments, the non-rotating stator 500 can be oriented longitudinally within the non-magnetic section of pipe 22. In embodiments, the rotating shaft 33 can extend longitudinally through the non-rotating stator 500. The non-rotating stator 500 can have at least one cone 520.

In embodiments, the second bearing 40a can be connected between the rotating shaft 33 and the non-rotating stator 500 and contained within the non-rotating stator and the first bearing 40b can be positioned downstream of the plurality of rare earth magnets 50a-50h.

Additional bearings, such as bearing 40c, can be used to absorb both radial and thrust loads and be located between the rotating device 600 and at least one of the pair of bearing support structures 490a.

Bearings 40a-40c can be supported on at least one of the pair of bearing support structures 490a and 490b. In embodiments, the pair bearing support structure 490a and 490b can have at least three pins 750a-750c. Each of the pins can engage a boss 760a and 760b. Each boss 760a and 760b can be mounted to the inner diameter of the non-magnetic section of pipe 22.

Each pin 750a-750c and boss 760a and 760b engagement can stop the non-rotating stator 500 from traveling longitudinally or rotating radially in the non-magnetic section of pipe.

In embodiments, the magnet support 120 can be interchanged with a rotating magnet propeller, as shown in these Figures.

In embodiments, a non-corrosive encapsulation material 840a-840h can be disposed around each rare earth magnet 50a-50h and comprise a metallic material, a ceramic material, or a polymeric material.

In embodiments, a particle diverter 410 can be contained within the non-magnetic section 22 of pipe upstream of the plurality of coils and upstream of the non-rotating stator.

The particle diverter 410 can be configured to move fluid away from an inner diameter of the non-magnetic section of pipe 22.

FIG. 8D is a non-rotating stator according to one or more embodiments.

In embodiments, he non-rotating stator 500 can have at least one cone 520, wherein the cone 520 can be secured upstream of a plurality of inlet guide vanes 540a-540t.

FIG. 8E is a rotating device according to one or more embodiments.

The blade device 600 with fan blades 602a-602t can be connected to the rotating shaft. In embodiments, the rotating shaft can be solid or hollow.

The rotating device 600 with fan blades 602a-602t can be configured to receive fluid from the plurality of inlet guide vanes.

In embodiments, the fan blades 602a-602t can be curved aerodynamically.

In embodiments, a plurality of non-rotating cone-free stators can alternate with the rotating device 600 or multiple rotating devices, wherein each rotating device can have a plurality of fan blades 602a-602t.

FIG. 8F depicts a bearing support structure according to one or more embodiments.

In embodiments, the bearing support structure can have at least three pins 750a-750c.

Additional bearings, such as bearing 40c, can be used to absorb both radial and thrust loads and be located between the rotating device and at least one of the pair of bearing support structures 490a.

The least one of the pair of bearing support structures 490a can be mounted on either side of the magnet support.

FIG. 8G depicts a magnet support according to one or more embodiments.

The magnet support 120, which can be a rotating magnet propeller, is shown pivotably surrounding the rotating shaft. The magnet support can have an optional blade mount 43, which is not necessary if support does not include rotating blades.

The plurality of rare earth magnets 50a-50h can be circumferentially mounted around the rotating shaft.

In embodiments, a plurality of struts 121a-121h can pivotably surround the rotating shaft. The plurality of struts 121a-121h can connect to the optional blade mount 43. The optional blade mount 43 can be connected to the rotating shaft.

In this embodiment, each of the plurality struts 121*a*-121*h* can have a magnet seat 37*a*-37*f*. Each magnet seat can support at least one of the plurality of rare earth magnets 50*a*-50*h* without disturbing fluid flow passing the plurality of struts 121*a*-121*h*.

FIG. 8H depicts a bearing support structure according to one or more embodiments.

The pair of bearing support structures 490*b* can be mounted on either side of the magnet support, wherein the magnetic support can be interchanged with a rotating magnet propeller.

FIG. 9A is an assembled view of the generator according to one or more embodiments. FIG. 9B is an assembled view of the generator according to one or more embodiments. FIG. 9C is an exploded view of the generator according to one or more embodiments.

The generator 300*b* can have the non-magnetic section of pipe 22, which can be connected between the first preexisting pipe and the second preexisting pipe.

The first preexisting pipe flange can engage the first preexisting pipe and the second preexisting pipe flange can engage the second preexisting pipe. The non-magnetic section of pipe 22 can be fluidly connected between the first pipe flange and second pipe flange.

In embodiments, the non-magnetic section of pipe can be at least one of: a metal alloy, a composite, and a ceramic material. The non-magnetic section of pipe can be configured to sustain up to 2100 psi without deforming.

The flux guide 240 can be secured to the outer surface 220 of the non-magnetic section of pipe 22.

In embodiments, the generator 300*b* can have the non-rotating stator 500, which can be oriented longitudinally within the non-magnetic section of pipe 22. The rotating shaft 33 can extend through the non-rotating stator 500.

The non-rotating stator 500 can have at least one cone 520.

In embodiments, the rotating device 600 can have fan blades and can be connected to the rotating shaft 33.

The plurality of rare earth magnets 50*a*-50*h* can circumferentially mounted around the rotating shaft 33.

In embodiments, bearing 40*b* can engage the bearing support structure 490*b*, bearing 40*a* can engage the non-rotating stator 500, and additional bearing 490*c* can engage the bearing support structure 490*a*.

The pair of bearing support structures 490*a* and 490*b* can have at least three pins 750*a*-750*c*. Each pin 750*a*-750*c* can engage a boss 760*a*-760*c*, which can be mounted to the inner diameter of the non-magnetic section of pipe 22.

Each pin 750*a*-750*c* and boss 760*a*-760*c* engagement can stop the non-rotating stator 500 from traveling longitudinally or rotating radially in the non-magnetic section of pipe.

The magnet support 120 is shown pivotably surrounding the rotating shaft 33.

In embodiments, a gear box 916 can be secured around the rotating shaft 33 between the rotating device 600 and the plurality of rare earth magnets 50*a*-50*h*.

A non-corrosive coating 860 can be used for at least one of: each non-rotating stator, and/or each plurality of rotating devices, and/or each rotating shaft. The non-corrosive coating 860 can be disposed on a portion of the rotating shaft 33.

In embodiments, the outer housing 104 can be disposed around the non-magnetic section of pipe containing the plurality of coils.

FIG. 10A depicts an open configuration of a flux guide according to one or more embodiments. FIG. 10B depicts a closed configuration of a flux guide according to one or more embodiments. FIG. 10C depicts an exploded version of a flux guide according to one or more embodiments.

The flux guide 240 can have a plurality of coils contained between the flux guide 240 and the non-magnetic section of pipe. One of the coils of the plurality of coils 28*a* is depicted.

The flux guide can be arranged to focus magnetic flux into the plurality of coils 28*a*. In embodiments, from 2 coils to 36 coils can be used per generator and 50 windings to 500 windings can be used per coil.

As an example and illustrative purpose only, to operate the generator, the generator can be installed between the first preexisting pipe and the second preexisting pipe containing fluid, such as a natural gas pipeline.

A six inch outer diameter and a two foot long non-magnetic section of pipe can be used in the generator The flux guide in the shape of a "donut" can be secured to the outer surface of the non-magnetic section of pipe. In this embodiment, the donut shaped flux guide can have a thickness of two inches. In other embodiments, the flux guide can be "E" shaped. The flux guide can extend one inch from the outer surface of the non-magnetic section of pipe.

In this example, eight coils can be contained between the flux guide and the non-magnetic section of pipe.

The flux guide focuses magnetic flux from the rotating rare earth magnets inside the non-magnetic section of pipe into the plurality of coils.

The non-rotating stator can be placed in the non-magnetic section of pipe upstream of the plurality of coils. The non-rotating stator can have eighteen inlet guide vanes. The non-rotating stator can be oriented longitudinally within the non-magnetic section of Pipe.

Pairs of the inlet guide vanes can form eighteen openings, each opening can have an individual dimension of 0.75 inches×1 inch.

In this example, the rotating device with fan blades can be connected to the rotating shaft, which can have an outer diameter of ⅝ inches.

The rotating shaft, in this example, can be 14 inches long and configured to extend through the non-rotating stator, through the rotating device with fan blades and past the rotating device with fan blades to support six rare earth magnets circumferentially mounted around the rotating shaft Each rare earth magnet can be configured to energize the plurality of coils. Each rare earth magnet can have a dimension of 1 inch×2 inches. In this example, each rare earth magnet is neodymium. In embodiments, combinations of different rare earth magnets can be used.

The controller can be electrically connected to the plurality of coils for receiving energy produced by the plurality of coils and transmitting the energy as current, such as to an automated battery charger.

In this example, natural gas acts as the fluid to cause the rotating device with fan blades to turn the rotating shaft that rotates the plurality of rare earth magnets to provide a rotating magnetic flux that energizes the plurality of coils generating a current of sufficient energy to produce 400 watts continuously under high gas flow conditions.

While these embodiments have been described with emphasis on the embodiments, it should be understood that within the scope of the appended claims, the embodiments might be practiced other than as specifically described herein.

What is claimed is:

1. A generator system with a generator connected between a first preexisting pipe and a second preexisting pipe, the generator system comprising:

a. a non-magnetic section of pipe connected between the first preexisting pipe and the second preexisting pipe;
b. a flux guide secured to an outer surface of the non-magnetic section of pipe;
c. a plurality of coils contained between the flux guide and the non-magnetic section of pipe, the flux guide arranged to focus magnetic flux into the plurality of coils;
d. a non-rotating stator in the nonmagnetic section of pipe upstream of the plurality of coils having a plurality of inlet guide vanes, the non-rotating stator oriented longitudinally within the non-magnetic section of pipe;
e. a rotating device connected to a rotating shaft, the rotating shaft extending through the non-rotating stator, the rotating device configured to receive a fluid from the plurality of inlet guide vanes;
f. a plurality of rare earth magnets circumferentially mounted around the rotating shaft for rotating the plurality of rare earth magnets, the plurality of rare earth magnets configured to energize the plurality of coils; and
g. a controller electrically connected to the plurality of coils for receiving energy produced by the plurality of coils and transmitting a current; and
wherein the fluid causes the rotating device to turn the rotating shaft rotating the plurality of rare earth magnets to provide the magnetic flux energizing the plurality of coils generating the current of sufficient energy to produce at least six watts continuously.

2. The generator system of claim 1, comprising a gear box secured around the rotating shaft between the rotating device and the plurality of rare earth magnets.

3. The generator system of claim 1, comprising a first bearing connected between the rotating shaft and the non-rotating stator and contained within the non-rotating stator.

4. The generator system of claim 3, comprising a second bearing positioned downstream of the plurality of rare earth magnets.

5. The generator system of claim 4, comprising an additional bearing and a pair of bearing support structures, the pair of bearing support structures comprising at least three pins, each pin engaging a boss mounted to the inner diameter of the non-magnetic section of pipe, each pin and boss engagement stopping the non-rotating stator from traveling or rotating in the non-magnetic section of pipe.

6. The generator system of claim 1, wherein the generator comprises a plurality of non-rotating cone-free stators alternating with a plurality of rotating devices, each rotating device having a plurality of fan blades.

7. The generator system of claim 6, wherein each fan blade of the plurality of the fan blades is curved aerodynamically.

8. The generator system of claim 1, wherein the non-rotating stator has at least one cone secured upstream of the plurality of inlet guide vanes.

9. The generator system of claim 1, comprising from 2 coils to 36 coils per generator.

10. The generator system of claim 1, comprising from 50 windings to 500 windings per coil.

11. The generator system of claim 1, comprising at least one rectifier connected between the plurality of coils and a load, the at least one rectifier configured for converting the current from alternative current to direct current.

12. The generator system of claim 1, wherein the non-magnetic section of pipe comprises at least one of: a metal alloy, a composite, and a ceramic, the non-magnetic section of pipe configured to sustain up to 2100 psi without deforming.

13. The generator system of claim 1, comprising a plurality of magnet seats, each magnet seat supporting at least one of the plurality of rare earth magnets.

14. The generator system of claim 1, comprising an outer housing disposed around the non-magnetic section of pipe containing the plurality of coils.

15. The generator system of claim 1, comprising a first preexisting pipe flange for engaging the first preexisting pipe and a second preexisting pipe flange for engaging the second preexisting pipe, wherein the non-magnetic section of pipe is fluidly connected between the first pipe flange and the second pipe flange.

16. The generator system of claim 1, comprising a particle diverter contained within the non-magnetic section of pipe upstream of the plurality of coils, the particle diverter configured to move the fluid away from the outer surface of the non-magnetic section of pipe.

17. The generator system of claim 1, comprising a magnet support for connecting around the rotating shaft and supporting the plurality of rare earth magnets.

18. The generator system of claim 1, comprising a non-corrosive encapsulation material around each of the plurality of rare earth magnets, the non-corrosive encapsulation material comprising a metallic material, a ceramic material, or a polymeric material.

19. The generator system of claim 1, comprising a non-corrosive coating for at least one of: each non-rotating stator, each rotating device, and the rotating shaft.

* * * * *